United States Patent
Huber et al.

(10) Patent No.: US 11,716,620 B2
(45) Date of Patent: *Aug. 1, 2023

(54) SUBSCRIBER IDENTITY MODULE WHICH HAS MULTIPLE PROFILES AND WHICH IS DESIGNED FOR AN AUTHENTICATION COMMAND

(71) Applicant: GIESECKE+DEVRIENT MOBILE SECURITY GMBH, Munich (DE)

(72) Inventors: Ulrich Huber, Munich (DE); Nils Nitsch, Markt Schwaben (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 171 days.

This patent is subject to a terminal disclaimer.

(21) Appl. No.: 17/485,642

(22) Filed: Sep. 27, 2021

(65) Prior Publication Data

US 2022/0014913 A1   Jan. 13, 2022

Related U.S. Application Data

(63) Continuation of application No. 15/779,256, filed as application No. PCT/EP2016/002023 on Nov. 30, 2016, now Pat. No. 11,202,201.

(30) Foreign Application Priority Data

Dec. 1, 2015   (DE) .......................... 102015015734.5

(51) Int. Cl.
*H04L 29/06*     (2006.01)
*H04W 12/06*     (2021.01)
(Continued)

(52) U.S. Cl.
CPC ......... *H04W 12/06* (2013.01); *H04L 63/0853* (2013.01); *H04L 67/303* (2013.01);
(Continued)

(58) Field of Classification Search
CPC ....... H04W 12/06; H04W 4/90; H04W 12/04; H04W 12/45; H04L 63/0853; H04L 67/303
(Continued)

(56) References Cited

U.S. PATENT DOCUMENTS 8,478,339 B2   7/2013   Bradley
8,954,067 B2   2/2015   Madsen
(Continued)

FOREIGN PATENT DOCUMENTS

CN   103518401 A   1/2014
CN   103765925 A   4/2014
(Continued)

OTHER PUBLICATIONS

Shaik, "New vulnerabilities in 4G and 5G cellular access network protocols: exposing device capabilities" May 2019, pp. 221-232 (Year :2019).*

(Continued)

*Primary Examiner* — Noura Zoubair
*Assistant Examiner* — Gregory A Lane
(74) *Attorney, Agent, or Firm* — Workman Nydegger

(57) ABSTRACT

A subscriber identity module (eUICC), comprises profiles for the utilization of a mobile terminal that include at least a first profile and at least a second profile, of which the second profile (Pr1, Pr2) is devised as an active profile. The first profile is designed as a root profile (PrR) which in a normal state of the subscriber identity module is in an inactive state, and which is devised to be activated in response to an authentication command (AUTHENTICATE) received at the subscriber identity module. The authentication command is specially parameterized for the root profile (PrR) with a specific root value of the network parameter (P2) to be activated during a change-over period.

(Continued)

The initially active second profile (Pr1, Pr2) is deactivated during the change-over period. After the end of the change-over period, the first profile (PrR) is again deactivated and the second profile (Pr1, Pr2) is again activated.

7 Claims, 1 Drawing Sheet

(51) Int. Cl.
*H04L 9/40* (2022.01)
*H04W 4/90* (2018.01)
*H04L 67/303* (2022.01)
*H04W 12/04* (2021.01)
*H04W 12/45* (2021.01)

(52) U.S. Cl.
CPC ............ *H04W 4/90* (2018.02); *H04W 12/04* (2013.01); *H04W 12/45* (2021.01)

(58) Field of Classification Search
USPC .......................................................... 726/6
See application file for complete search history.

(56) References Cited

U.S. PATENT DOCUMENTS

| | | |
|---|---|---|
| 9,907,001 B2 | 2/2018 | Jin et al. |
| 2005/0154925 A1 | 7/2005 | Chitrapu et al. |
| 2013/0005402 A1 | 1/2013 | Bradley |
| 2013/0165073 A1 | 6/2013 | Madsen |
| 2013/0331063 A1 | 12/2013 | Cormier et al. |
| 2013/0339305 A1* | 12/2013 | Kim .................. H04W 12/04 707/652 |
| 2014/0228071 A1 | 8/2014 | Villarrubia et al. |
| 2015/0110035 A1* | 4/2015 | Lee .................. H04W 8/183 370/329 |
| 2015/0237496 A1 | 8/2015 | Gao et al. |
| 2015/0237551 A1 | 8/2015 | Jin et al. |
| 2015/0281957 A1 | 10/2015 | Hartel et al. |
| 2016/0012465 A1* | 1/2016 | Sharp .................. G06Q 20/321 705/14.17 |
| 2016/0212617 A1* | 7/2016 | Koshimizu .......... H04W 12/35 |
| 2017/0149933 A1* | 5/2017 | Lee .................. H04L 67/306 |

FOREIGN PATENT DOCUMENTS

| | | |
|---|---|---|
| CN | 103765934 A | 4/2014 |
| CN | 104126330 A | 10/2014 |

OTHER PUBLICATIONS

"Embedded SIM Task Force Requirements and Use Cases." GSM Association, V1.0, Feb. 21, 2011, pp. 1-38.
Chinese Search Report from corresponding CN Application No. 201680076642.7, dated Aug. 24, 2020.
Extended Search Report from corresponding EP Application No. EP20020523.5, dated Mar. 26, 2021.
"Remote Provisioning Architecture for Embedded UICC Technical Specification Version 2.0," GSM Association, Oct. 13, 2014, 293 Pages.
"Smart Cards; Remote APDU Structure for UICC Based Applications (Release 9)," ETSI TS 102 226, V9.6.0, Jan. 2013, 42 Pages.
"Smart Cards; UICC-Terminal Interface; Physical and Logical Characteristics (Release 4)," ETSI TS 102 221, V4.16.0, Jul. 2007, 126 Pages.
International Search Report from PCT Application No. PCT/EP2016/002023, dated Mar. 3, 2017.
Chen et al., "NFC Mobile Transactions and Authentication based on GSM Network," IEEE Computer Society, at least by Dec. 31, 2010, pp. 83-89.

* cited by examiner

| Code | Value [ETSI 102 221, v4.16.0, AUTHENTICATE] |
|---|---|
| CLA | TS 31.101 [11] |
| INS | '88' |
| P1 | '00' |
| P2 | b8...b3...b1 → 11.18 |
| Lc | ... |
| Data | |
| Le | |

11.18

| P2: b3-b1 | Value |
|---|---|
| 000 | GSM – G2 |
| 001 | UMTS – G3 |
| 010 | VGCS / VBS |
| 100 | GBA |
| 111 | ISD-R |

SUBSCRIBER IDENTITY MODULE WHICH HAS MULTIPLE PROFILES AND WHICH IS DESIGNED FOR AN AUTHENTICATION COMMAND

BACKGROUND

Field of the Invention

The invention relates to a subscriber identity module comprising at least two subscription profiles and devised to receive and to process an authentication command AUTHENTICATE.

For utilizing a mobile end device such as a smartphone or mobile telephone in a mobile communication network of a network provider, the end device contains a subscriber identity module having a subscription profile or also simply profile. The subscription profile is formed by a data set which enables the establishment, operation and disconnection of a connection of the end device in the mobile communication network, and comprises, for example, a cryptographic authentication key Ki and an International Mobile Subscriber Identity IMSI. The subscriber identity module can be designed either as a removable plug-in SIM card (SIM=Subscriber Identity Module) or USIM card (Universal SIM) or UICC (Universal Integrated Circuit Card), or alternatively as solid-soldered eUICC (embedded UICC) or eSIM or eUSIM.

Prior Art

Meanwhile subscriber identity modules having several subscription profiles are also manufactured. In order to keep the end device uniquely addressable at all times, preferably only a single profile is in an active enabled state at any time. Further profiles contained in the subscriber identity module are in an inactive disabled state.

The document [1] SGP02-Remote-Provisioning-Architecture-for-Embedded-UICC-Technical-Specification-v2.0, 13 Oct. 2014, GSMA describes the provisioning or—equivalently—remote maintenance of profiles in a subscriber identity module in the form of eUICC. Functions in the eUICC can be carried into effect by means of the commands which an external server, namely the Sub Man Secure Router SM-SR, sends to a privileged entity within the eUICC, namely the Issuer Security Domain Root ISD-R (ISD-Root). As a result of this, the contents of the remote maintenance are implemented in the eUICC.[1] Chapter 3 describes the creating of a new profile P in an eUICC. In so doing, the SM-SR sends a command to the Root Domain ISD-R located in the eUICC for creating an Issuer Security Domain ISD-P for the profile P. The root domain prompts the creating ("create") of the ISD-P. The ISD-P is personalized with a first key set. Thereupon the profile data, thus the actual profile, are loaded into the eUICC. The profile can be activated by a subsequent "enable" command from the SM-SR via the Root Domain ISD-R to the Profile Domain ISD-P. According to [1] Chapter 5.3.5, a profile in the eUICC can be activated by means of a function ProfileEnable executed in the eUICC, thus put (switched) into an active state or status. The ProfileEnable function is carried into effect by the fact that the Sub Man Secure Router SM-SR sends the corresponding command to the Security Domain ISD-R (ISD-Root) of the eUICC.

For the normal operation the user of the end device has stored a contract with a mobile network operator and a corresponding profile of the network provider in the subscriber identity module. Normal operation, for example telephone calls, SMS and MMS exchange, Internet surfing etc. are processed primarily via the mobile communication network of the network provider.

In special situations of utilizing an end device, for example emergency call or "eCall", or device test in the manufacture, it would be desirable to have other, alternative subscription parameters at one's disposal than for the normal operation of the end device in the mobile communication network.

The parameters for the special situation are stored in a separate alternative subscription profile. Conventionally, to be able to utilize the alternative profile, a command ProfileEnable has to be sent to the subscriber identity module to activate the alternative profile. Subsequently the profile is utilized for connections in the mobile communication network for the special situation. After termination of the special situation, a further command ProfileEnable has to be sent to the subscriber identity module to again activate the profile for the normal operation. Each special situation therefore requires two ProfileEnable commands to twice switch the active profile.

The wish for an alternative profile can arise even then if proprietary and owner of the subscriber identity module differ from each other. Owner is, for example, an end-device manufacturer, later owner a mobile network operator.

The document [2] ETSI 102 221 v4.16.0, 2007-07, is an interface specification for the communication between an UICC and a terminal. [2] in chapter 11.1.16 defines the command AUHTENTICATE by which the terminal prompts in the UICC that in the UICC an authentication value is computed originating from a secret stored in the UICC and a challenge received by the terminal. The command AUHTENTICATE is devised to be parameterized with the parameters stated in chapter 11.1.16.2, among other things, with the network parameter P2. A technology—also designated as context—can be stated by the network parameter P2, which the mobile communication network employed for authentication should be subjected to. According to table 11.18, last line, certain values of the last five bytes b5b4b3b2b1 of the network parameter P2 are provided as referencing data (see FIG. 2). An AUTHENTICATE command having one of the stated values in the network parameter P2 leads to an authentication for the corresponding context, that is for a mobile communication network under the corresponding technology.

In the future, automobile manufacturers will be obligated to equip their new cars with an emergency call system (eCall or emergency Call) in which in an emergency automatically an eUICC or in general M2M module installed in the automobile outputs an emergency call via a mobile communication network. As may be the case, a certain mobile communication network is prescribed for the outputting of the emergency call. This does not need to match the mobile communication network which the owner of the automobile himself or herself usually utilizes.

Manufacturers of end devices carry out device analysis tests for end devices (for newly manufactured ones and those already in the field) at their manufacturing sites to identify possible faulty end devices. For such a device analysis test, a mobile communication network is simulated by means of an analysis device or an analysis system, a so-called test network. An authentication is carried out between the examined end device and the simulated test network by means of ETSI 102 221 AUTHENTICATE. Conventionally the manufacturer removes the SIM card from the end device for the device analysis test and replaces it with a test SIM which is devised for authenticating in the simulated test network. In particular, the test SIM contains an authentication key which is known to the simulated test network. For solid-soldered eUICCs such a SIM card exchange is not possible.

SUMMARY OF THE INVENTION

The cited special situations (eCall, device test) are merely temporary. In contrast, the profile switching with ProfileEnable is permanent. The invention is based on the object of creating a subscriber identity module which enables a merely temporary, transient activation of an alternative profile, and as a result of this enables a profile switching with reduced effort.

The object is achieved by a subscriber identity module according to claim 1. Advantageous embodiments of the invention are stated in the dependent claims.

The inventive subscriber identity module according to claim 1 comprises profiles for the utilization of a mobile end device in mobile communication networks. The profiles comprise at least a first profile and at least a second profile. From this the second profile is devised as an active profile. The subscriber identity module is devised to receive and to process an authentication command parameterized with a network parameter, and as a result of this to compute authentication data for a mobile communication network determined by a network value of the network parameter. The subscriber identity module is characterized in that the first profile is designed as a root profile which in a normal state of the subscriber identity module is in an inactive state, and which is devised to be activated during a change-over period in response to an authentication command received at the subscriber identity module, said authentication command being specially parameterized for the root profile with a specific root value of the network parameter. In the process, the at first active second profile is deactivated during the change-over period. After the end of the change-over period, the first profile is again deactivated and the second profile is again activated.

The operations of deactivating the standardly active second profile, activating the first profile (i.e. the root profile), and after the end of the change-over period re-activating the standard second profile is automatically effectuated by the specifically parameterized authentication command, and without having to actively monitor the change-over period. Conventionally four commands would be required for this achieved effect, namely DISABLE second profile, ENABLE first profile and, after the end of the change-over period DISABLE first profile, ENABLE second profile, wherein additionally the change-over period has to be actively monitored.

Hence, according to claim 1, a subscriber identity module is created which enables a merely temporary, transient activation of an alternative profile, and as a result of this enables a profile switching with reduced effort.

A special situation can, for example, be an emergency in which an emergency phone call, a so-called eCall or emergency call, should be output via a predetermined network, which as may be the case differs from the network for the normal operation. A further special situation can be a device test in the end device during the manufacture of the end device, wherein a connection should be made to an internal test network of the end-device manufacturer, without fee-based connections to networks of mobile network operators arising. A further special situation can be a service call in which the user of the end device calls a customer service server of a service provider, and in reaction is supplied services of the service provider, such as consulting, software download to the end device, or the like. With the inventive, specifically parameterized authentication command, the active profile is transiently switched, for the duration of the change-over period, from the standard profile (second profile) to, for example, an emergency call profile (eCall profile) for an emergency call network, or to a test profile for a test network, or to a service profile for a service call.

The change-over period is preferably limited in time to the duration of the processing of the authentication command. As a result of this, as soon as the specifically parameterized authentication command is processed, the standardly active first profile is automatically again activated, and the root profile is put back to the deactivated state.

As a value of the network parameter there is electively provided: P2=P3G (81) as network value for network 3G, P2=P2G (80) as network value for network 2G, a value P2=PR (e.g. FF) different from P2=P3G and P2=P2G possibly further network values and preferably different from further pre-allocated values as a root value for the transient activation of the root profile.

Electively an APDU command is provided as an authentication command, in particular an AUTHENTICATE command according to ETSI 102 221, and parameter P2 as parameter.

As a first profile, electively a profile of an owner of the subscriber identity module is provided, in particular of an end-device manufacturer, and as the second profile a profile of an owner of the subscriber identity module, in particular of a network provider.

As a first profile, electively one of the following is provided: an emergency profile for outputting an emergency call in an emergency call network in an emergency situation; a test profile for carrying out an end-device test in a test network; a service profile for calling a service network of a service provider.

The profile electively comprises respectively an authentication key (e.g. Ki). The authentication command is devised electively for computing, originating from the authentication key of the currently active profile, the authentication data.

The profile electively comprises respectively an Issuer Security Domain.

Electively, the subscriber identity module further comprises an Issuer Security Domain Root which is devised in particular as an end point situated in the subscriber identity module of the channel provided for provisioning the subscriber identity module between the Sub Man Secure Router and the subscriber identity module. Electively the first profile has an Issuer Security Domain which is identical to the Issuer Security Domain Root. In a different view, not only an Issuer Security Domain Root, but an entire root profile is created in the subscriber identity module.

BRIEF DESCRIPTION OF THE DRAWINGS

Hereinafter the invention will be explained more closely on the basis of exemplary embodiments and with reference to the drawing, in which are shown.

DETAILED DESCRIPTION OF EMBODIMENT EXAMPLES

Figures 1, 2:
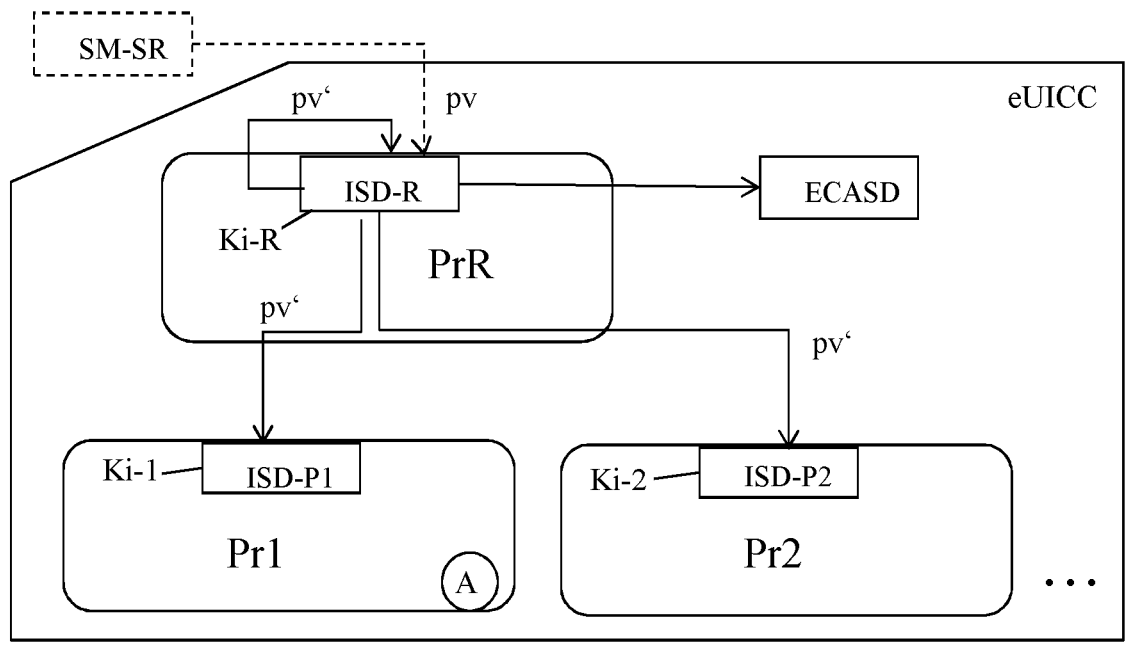
FIG. 1 a subscriber identity module having three profiles, according to one embodiment of the invention.
FIG. 2 parameters of the ETSI 102 221 AUTHENTICATE commands, with the inventive extended parameterization.

FIG. 1 shows a subscriber identity module eUICC having three profiles PrR, Pr1, Pr2, according to one embodiment of the invention. A first profile is designed as a root profile PrR and comprises an Issuer Security Domain Root ISD R. Two second profiles Pr1 and Pr2 are designed as usual subscription profiles and comprise respectively a profile-specific Issuer Security Domain ISD-P1 or ISD-P2. Further profiles can still be contained in the subscriber identity module eUICC. Profile Pr1 is in FIG. 1 the (normally) active profile, as is indicated by the A in the circle. Further, the subscriber identity module eUICC having the Issuer Security Domain Root IDS-R contains a coupled, embedded CASD, ECASD in which certificates and keys are stored for the downloading of profiles.

The Issuer Security Domain ISD-R of the Root Profile PrR is at the same time the Issuer Security Domain Root (ISD-R) which is devised as an end point situated in the subscriber identity module eUICC of the channel provided for provisioning the subscriber identity module between the Sub Man Secure Router SM-SR and the subscriber identity module eUICC. For provisioning the eUICC, the SM-SR sends general provisioning commands pv to the Issuer Security Domain Root ISD-R. The Issuer Security Domain Root ISD-R forwards the provisioning commands pv, represented in FIG. 1 as a pv', to the Issuer Security Domains ISD-P* of the individual profiles Pr*. In particular, the Issuer Security Domain Root ISD-R thus provisions the Issuer Security Domains ISD-P1 and ISD-P2, but also itself. The Issuer Security Domain ISD-P1, ISD-P2, ISD-R contains respectively also the authentication key Ki-1, Ki-2, Ki-R of the profiles Pr1, Pr2 or PrR. In particular, the root profile PrR thus also contains a separate authentication key Ki-R which is linked in the root profile PrR, more precisely to the Issuer Security Domain Root ISD-R.

FIG. 2 shows a table with parameters of the ETSI 102 221 AUTHENTICATE commands having the inventive extended parameterization. Part A of the table from FIG. 2 shows, besides other parameters, the network parameter P2 of the command AUTHENTICATE with which the employed network technology can be stated, and for which eight bits b8 . . . b3 . . . b1 are available. Part B of the table shows conventional values for the last three bits b3 . . . b1 of the network parameter P2. The following encoding of the last three bits b3b2b1 of P2 is established. GSM (2G) context or technology are designated by the value b3b2b1=000. UMTS (3G) context or technology are designated by the value b3b2b1=001. VGCS/VBS context or technology are designated by the value b3b2b1=010. GBA context or technology are designated by the value b3b2b1=100. According to the invention, not the value allocated as a network value b3b2b1=111 is employed for effectuating a transient switching of the active profile of the permanently active profile Pr1 (or, where applicable, Pr2) of the subscriber identity module eUICC to the root profile PrR, for the duration of the processing of the command AUTHENTICATE.

If thus the command AUTHENTICATE having the parameter value P2=b3b2b1=111 (** stands for further bits which are not of importance for the invention) arrives at the subscriber identity module eUICC, the Issuer Security Domain Root ISD-R transfers the active status of the normal profile Pr1 to the root profile PrR. Thereupon the subscriber identity module eUICC computes authentication data while employing of the authentication key Ki-R of the Root Domain R, i.e. of the root profile PrR. As soon as the processing of the command AUTHENTICATE is completed, the active status automatically changes back from the root profile to the normal profile Pr1.

CITED PRIOR ART

[1] SGP02-Remote-Provisioning-Architecture-for-Embedded-UICC-Technical-Specification-v2.0, 13 Oct. 2014, GSMA

[2] ETSI 102 221 v4.16.0, 2007-07

The invention claimed is:

1. A subscriber identity module (eUICC), comprising profiles, stored in a non-transitory memory, for utilization of a mobile terminal in mobile communication networks, wherein the profiles comprise at least a first profile and at least a second profile, of which the second profile (Pr1, Pr2) is devised as an initially active second profile,
   the subscriber identity module devised to receive and to process an authentication command (AUTHENTICATE) parameterized with a network parameter (P2), and as a result of this to compute authentication data for a mobile communication network determined by a network value of the network parameter (P2),
   wherein the first profile is a root profile (PrR) which in a normal state of the subscriber identity module is in an inactive state, and which is devised to be activated a duration of processing of the authentication command (AUTHENTICATE) received at the subscriber identity module, said authentication command being specially parameterized for the root profile (PrR) with a predefined specific root value of the network parameter (P2) to be activated during a change-over period, wherein the initially active second profile (Pr1, Pr2) is deactivated during the change-over period, and wherein after the end of the change-over period, the first profile (PrR) is automatically deactivated and the second profile (Pr1, Pr2) is automatically activated; and
   wherein as the first profile, one of the following is provided: an emergency profile for outputting an emergency call in an emergency situation in an emergency call network; a test profile for carrying out an end-device test on a test network; a service profile for calling a service network of a service provider.

2. The subscriber identity module according to claim 1, wherein as a value of the network parameter (P2) there is provided: P2=P3G as a network value for network 3G, P2=P2G as a network value for network 2G, a value P2=PR different from P2=P3G and P2=P2G and different from further pre-allocated values as a root value for a transient activation of the root profile.

3. The subscriber identity module according to claim 1, wherein an application protocol data unit (APDU) command is provided as an authentication command.

4. The subscriber identity module according to claim 1, wherein as the first profile, a profile of a manufacturer of the subscriber identity module is provided, and as the second profile, a profile of an owner of the subscriber identity module is provided, in particular of a network provider.

5. The subscriber identity module according to claim 1, wherein a profile (P) comprises respectively an authentication key (Ki), and wherein the authentication command (AUTHENTICATE) is devised for computing, originating from the authentication key (Ki-1, Ki-2, Ki-R) of a currently active profile (Pr1, Pr2, PrR), the authentication data.

6. The subscriber identity module according to claim 1, wherein the profile (Pr1, Pr2, PrR) comprises respectively an Issuer Security Domain (ISD-P1, ISD-P2, ISD-R).

7. The subscriber identity module according to claim 1, which further comprises an Issuer Security Domain Root (ISD-R) which is devised in particular as an end point situated in the subscriber identity module of a channel provided for provisioning the subscriber identity module between a Sub Man Secure Router (SM-SR) and the subscriber identity module and wherein the first profile has an Issuer Security Domain (ISD-R).

* * * * *